UNITED STATES PATENT OFFICE.

ORIELLA I. LITTELL, OF WASHINGTON, DISTRICT OF COLUMBIA.

CLEANING AND POLISHING COMPOUND.

SPECIFICATION forming part of Letters Patent No. 529,281, dated November 13, 1894.

Application filed February 26, 1894. Serial No. 501,594. (Specimens.)

*To all whom it may concern:*

Be it known that I, ORIELLA I. LITTELL, a citizen of the United States, residing at Washington, in the District of Columbia, have invented certain new and useful Improvements in Cleansing and Polishing Compounds, of which the following is a specification.

My invention consists in a novel composition of matter, for cleaning and polishing metals, gems, glass, and other substances and articles requiring a high and lasting polish. The ingredients employed may be somewhat varied in their proportions, and measurably good results can be secured without the use of all of them, though I prefer to employ all the ingredients named, and to adopt substantially the proportions herein given.

The preparation consists of: zinc white, (oxide of zinc,) seven parts by weight; French chalk, one part by weight; magnesia, one half of one part by weight; linseed oil, ten drops; alcohol, one-half ounce; water, from one and a half to two and a half ounces.

In preparing the composition, I first mix the powdered solids, and then add the oil, rubbing or grinding them all thoroughly together. The alcohol and water are then combined, and the mixture is added to the solids, and the whole is thoroughly shaken or stirred to intimately mingle the several ingredients.

Sweet oil, or other pure oil may be used instead of linseed oil, and the magnesia may be omitted without serious detriment, though I prefer to use it because of the peculiar hue which it imparts to some metals when the compound is used upon them.

It is not essential that the ingredients be combined in the order stated, though in practice I find it convenient to follow the order given.

It is apparent that the relative proportions may be varied within reasonable limits without departing from the spirit or scope of my invention; but the proportions given are those which experience has shown to be best.

In applying the preparation, the surface or article to be polished is washed or scrubbed with the liquid, which should have sufficient water to give it about the consistency of rich milk; after which the surface is rubbed with chamois skin, canton flannel, or other soft material. It is next washed with clean water, and will then present a high polish, which will be found extremely lasting.

As the solid matters tend to precipitate, the solution should be well shaken before being used.

Having thus described my invention, what I claim is—

1. A cleansing or polishing compound, consisting of zinc white, French chalk, magnesia, linseed oil, alcohol, and water, in substantially the proportions stated.

2. A cleansing and polishing compound, comprising zinc white, French chalk, oil, alcohol and water, substantially as set forth.

In witness whereof I hereunto set my hand in the presence of two witnesses.

ORIELLA I. LITTELL.

Witnesses:
  WILLIAM W. DODGE,
  HORACE A. DODGE.